(No Model.)
O. W. MASON.
ATTACHMENT FOR VEHICLES.
No. 509,542. Patented Nov. 28, 1893.
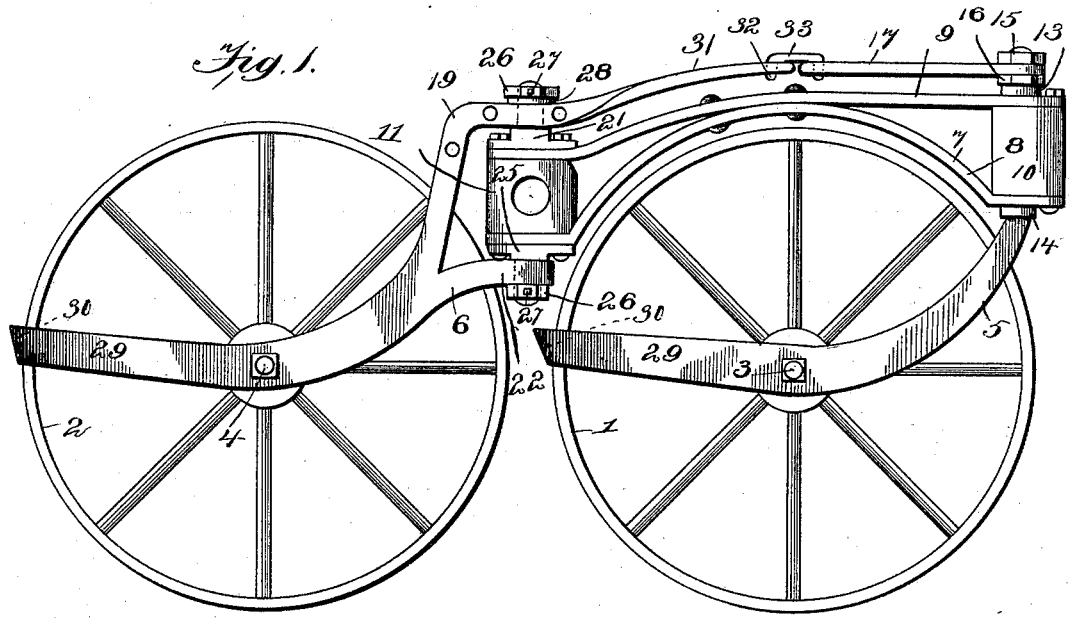
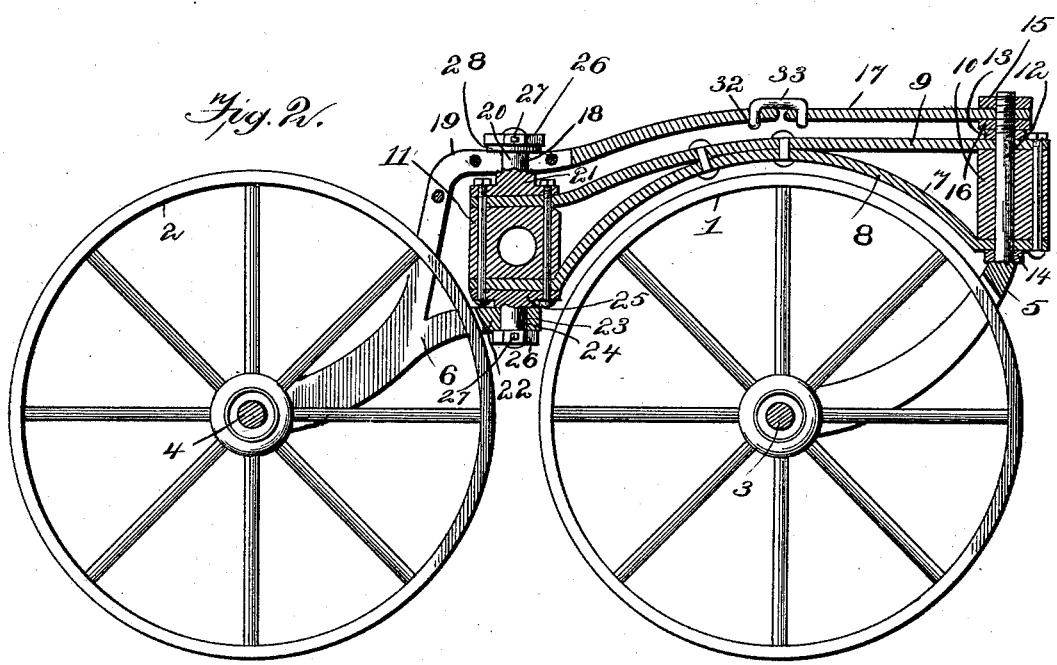
Witnesses
John C. Shaw.
N. J. Riley
Inventor
Orris. W. Mason.
By his Attorneys.
C. A. Snow & Co.
THE NATIONAL LITHOGRAPHING COMPANY,
WASHINGTON, D. C.

UNITED STATES PATENT OFFICE.

ORRIS W. MASON, OF BUDA, ILLINOIS.

ATTACHMENT FOR VEHICLES.

SPECIFICATION forming part of Letters Patent No. 509,542, dated November 28, 1893.

Application filed May 25, 1893. Serial No. 475,504. (No model.)

*To all whom it may concern:*

Be it known that I, ORRIS W. MASON, a citizen of the United States, residing at Buda, in the county of Bureau and State of Illinois, have invented a new and useful Attachment for Vehicles, of which the following is a specification.

The invention relates to improvements in attachments for vehicles, sulky plows, stalk cutters, and the like.

The object of the present invention is to enable vehicles, sulky plows, stalk cutters, and similar machines to move over uneven ground, such as furrowed fields, without the usual up and down motion.

The invention consists in the construction and novel combination and arrangement of parts hereinafter fully described, illustrated in the accompanying drawings and pointed out in the claims hereto appended.

In the drawings—Figure 1 is a side elevation of a vehicle attachment embodying the invention. Fig. 2 is a vertical longitudinal sectional view.

Like numerals of reference indicate corresponding parts in all the figures of the drawings.

1 and 2 designate front and rear wheels journaled on horizontal bolts or spindles 3 and 4 of front and rear bifurcated standards 5 and 6, which are curved downward and rearward, and swiveled at their upper ends to the ends of a longitudinally disposed connecting frame 7. The connecting frame 7 consists of a lower curved bar 8, which is arched over the front wheel 1, and an upper bar 9 centrally secured to the lower bar and having a horizontal front portion and a slightly inclined rear portion. The ends of the bars 8 and 9 are arranged horizontally and have secured between them a vertically disposed journal box 10 arranged at the front of the frame 7, and a horizontally disposed journal box 11 arranged at the rear end of the frame.

The journal box 10 receives a vertical spindle 12 of the front standard 5, which is swiveled to the front end of the frame by upper and lower collars 13 and 14. The upper end of the spindle 12 of the front standard is threaded, and has secured to it between nuts 15 and 16 a rearwardly extending arm 17, which is rigid with the front standard.

The horizontal journal box 11 is adapted to fit on the spindle of an axle of a sulky-plow, a stalk chopper or similar machine, and is to take the place of the wheel at the land side of the machine. The rear standard consists of two sides secured together by rivets or similar fastening devices at the top and it is provided with an opening 18 in a horizontal portion 19 to receive a journal 20 of a plate 21, which is fastened to the top of the horizontal journal box, the end of the bar 9 of the connecting frame being interposed between the plate 21 and the journal box 11. The upper portion of the rear standard is forked and the lower side 22 of the fork is arranged parallel with the horizontal portion 19 of the upper side of the fork, and is provided with an opening 23 receiving a journal 24 of a plate 25 similar to the upper plate 21. On the end of each of the journals of the horizontal journal box is a collar 26 which is provided with a set screw 27, and between the upper collar and the horizontal portion 19 is interposed a loose collar 28. The outer sides of the bifurcated standards are provided with rearward extensions 29, which are disposed horizontally at the back of the wheels, and are provided with inclined scraper blades 30 to free the wheels. The upper side of the fork of the rear standard is provided with a forwardly extending arm 31 forming a continuation of the horizontal portion 19 and terminating a short distance from the arm 17 of the front standard. The arms 17 and 31 are provided at their adjacent ends with perforations, in which are arranged depending ends 32 of a link bar 33. The adjacent ends of the said arms 17 and 31 are separated laterally, and the link bar is substantially transversely disposed. This arrangement causes the wheels to turn in unison, the link bar forming a species of hinge connection.

The axle bolts of the wheels are equi-distant of the journal box 11, and the wheels are arranged a sufficient distance apart, so that when one wheel is at the top of a ridge the other will be near the bottom of the furrow, and the attachment in moving over a furrowed field will maintain the axle in the same horizontal plane, and will prevent the up and down motion incident to a single wheel passing over such uneven ground.

The attachment is adapted for vehicles, wheelbarrows and the like, and it will be readily seen that it is exceedingly advantageous in wheel-plows, stalk cutters, and similar apparatus where it is desirable to maintain the plow-shares, knives and the like at the same depth or elevation, and where the up and down motion incident to the ordinary arrangement of wheels is inconvenient and undesirable.

Changes in the form, proportion and the minor details of construction may be resorted to without departing from the principle or sacrificing any of the advantages of this invention.

What I claim is—

1. The combination of the front and rear wheels, the front and rear standards receiving the wheels, a longitudinally disposed frame connecting the standards and having them swiveled to its ends and provided with a horizontal journal box to receive an axle spindle, and means for connecting the standards whereby the wheels are caused to turn laterally in unison, substantially as described.

2. The combination of a longitudinally disposed frame provided at its front end with a vertical journal box and at its rear end with a horizontal journal box adapted for the reception of an axle spindle, vertically disposed journals arranged on the top and bottom of the horizontal journal box, a front standard provided at its top with a spindle arranged in the vertical journal box, a rear standard having its upper portion forked and mounted on said journals, wheels journaled on the standards, and means for connecting the standards to cause the wheels to turn to the right or left in unison, substantially as described.

3. The combination of a longitudinally disposed frame provided at its front end with a vertical journal box and at its rear end with a horizontal journal box adapted to receive an axle spindle, a front standard having a spindle swiveled in the front journal box, vertically disposed journals arranged on the top and bottom of the rear journal box, a rear standard having its upper portion forked and swiveled to said journals and provided at the upper side of the fork with a forwardly extending arm, wheels journaled on the standards, a rearwardly extending arm rigidly connected with the spindle of the front standard, and a link bar pivotally connected to the ends of the said arms, substantially as and for the purpose described.

4. The combination of a longitudinally disposed frame composed of upper and lower bars having horizontally arranged ends and centrally secured together, the lower bar being arched, the front and rear journal boxes being secured between the ends of the bars of the frame, the upper and lower plates secured above and below the rear journal box and provided with vertical journals, a front standard having a spindle swiveled in the front journal box, a rear standard having its upper portion forked and provided with parallel horizontal portions receiving the journals and swiveled thereon, wheels journaled on the standards, and arms extending rearward and forward from the standards and connected together, substantially as described.

5. The combination of a longitudinally disposed frame provided with a horizontal journal box adapted for the reception of an axle spindle, wheels arranged in tandem, bifurcated standards depending from the frame and having wheels journaled in their bifurcations and provided with rearward extensions terminating at the backs of the wheels and provided with scraper blades, substantially as described.

In testimony that I claim the foregoing as my own I have hereto affixed my signature in the presence of two witnesses.

ORRIS W. MASON.

Witnesses:
W. G. AKIN,
C. P. MASON.